(12) United States Patent
Oh et al.

(10) Patent No.: US 11,189,278 B2
(45) Date of Patent: Nov. 30, 2021

(54) DEVICE AND METHOD FOR PROVIDING RESPONSE MESSAGE TO USER INPUT

(71) Applicant: SAMSUNG ELECTRONICS CO., LTD., Suwon-si (KR)

(72) Inventors: Hyungrai Oh, Suwon-si (KR); Hyeonmok Ko, Suwon-si (KR); Silas Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 16/364,433

(22) Filed: Mar. 26, 2019

(65) Prior Publication Data

US 2019/0295549 A1    Sep. 26, 2019

(30) Foreign Application Priority Data

Mar. 26, 2018    (KR) .......................... 10-2018-0034546

(51) Int. Cl.
*G10L 15/22* (2006.01)
*H04W 4/021* (2018.01)
(Continued)

(52) U.S. Cl.
CPC ................ *G10L 15/22* (2013.01); *G06N 3/08* (2013.01); *G10L 15/063* (2013.01); *G10L 15/16* (2013.01);
(Continued)

(58) Field of Classification Search
CPC .................................. G06N 3/006; G06N 3/08
(Continued)

(56) References Cited

U.S. PATENT DOCUMENTS 7,962,578 B2    6/2011    Makar et al.
9,318,108 B2    4/2016    Gruber et al.
(Continued)

FOREIGN PATENT DOCUMENTS

KR    10-0521865 B1    10/2005

OTHER PUBLICATIONS

T. Lu, "Model-Based Decision Making Support in Mobile Service," 2007 International Conference on Service Systems and Service Management, Chengdu, 2007, pp. 1-5, doi: 10.1109/ICSSSM.2007. 4280149. (Year: 2007) (Year: 2007).*
(Continued)

*Primary Examiner* — Bharatkumar S Shah
(74) *Attorney, Agent, or Firm* — Sughrue Mion, PLLC

(57) ABSTRACT

A method, performed by a device, of providing a response message to a user input includes obtaining location information of the device; executing a service providing agent corresponding to the location information; receiving a speech input from a user; generating the response message based on the received speech input, the response message being related to a service provided by the executed service providing agent; and displaying the generated response message, wherein the executed service providing agent generates the response message using a model trained using an artificial intelligence (AI) algorithm, the trained model being one from among a plurality of trained models each corresponding to a respective service from among a plurality of services provided by a respective service providing agent from among a plurality of service providing agents, and wherein the trained model corresponds to the executed service providing agent.

14 Claims, 13 Drawing Sheets

(51) Int. Cl.
*G10L 15/06* (2013.01)
*G10L 15/30* (2013.01)
*G06N 3/08* (2006.01)
*G10L 15/16* (2006.01)
*H04M 1/72457* (2021.01)

(52) U.S. Cl.
CPC ......... *G10L 15/30* (2013.01); *H04M 1/72457* (2021.01); *H04W 4/021* (2013.01); *G10L 2015/223* (2013.01)

(58) Field of Classification Search
USPC ........................................................ 704/232
See application file for complete search history.

(56) References Cited

U.S. PATENT DOCUMENTS

| | | | | |
|---|---|---|---|---|
| 9,942,214 | B1* | 4/2018 | Burciu | H04L 63/08 |
| 2014/0074743 | A1* | 3/2014 | Rademaker | G06Q 10/083 |
| | | | | 705/334 |
| 2017/0345105 | A1* | 11/2017 | Isaacson | G06Q 30/0633 |
| 2018/0052664 | A1* | 2/2018 | Zhang | G06F 16/90332 |
| 2018/0232664 | A1* | 8/2018 | Gelfenbeyn | G06N 20/00 |

OTHER PUBLICATIONS

B. Liu and I. Lane, "Iterative policy learning in end-to-end trainable task-oriented neural dialog models," 2017 IEEE Automatic Speech Recognition and Understanding Workshop (ASRU), Okinawa, 2017, pp. 482-489, doi: 10.1109/ASRU.2017.8268975. (Year: 2017 (Year: 2017).*

T. Lu, "Model-Based Decision Making Support in Mobile Service," 2007 International Conference on Service Systems and Service Management, Chengdu, 2007, pp. 1-5, doi: 10.1109/ICSSSM.2007. 4280149. (Year: 2007) (Year: 2007) (Year: 2007).*

B. Liu and I. Lane, "Iterative policy learning in end-to-end trainable task-oriented neural dialog models," 2017 IEEE Automatic Speech Recognition and Understanding Workshop (ASRU), Okinawa, 2017, pp. 482-489, doi: 10.1109/ASRU.2017.8268975. (Year: 2017 (Year: 2017) (Year: 2017).*

* cited by examiner

DEVICE AND METHOD FOR PROVIDING RESPONSE MESSAGE TO USER INPUT

CROSS-REFERENCE TO RELATED APPLICATION

This application is based on and claims priority under 35 U.S.C. § 119 to Korean Patent Application No. 10-2018-0034546, filed on Mar. 26, 2018, in the Korean Intellectual Property Office, the disclosure of which is incorporated by reference herein in its entirety.

BACKGROUND

1. Field

The disclosure relates to a device and method for providing a response message to a user input, and more particularly, to a device and method for providing a response message to a speech input of a user or a text input by executing a service providing agent based on location information of the user.

2. Description of Related Art

An artificial intelligence (AI) system is a computer system with human level intelligence. Unlike an existing rule based smart system, the AI system, such as a deep learning based AI system, is a system that trains autonomously, makes decisions, and becomes increasingly smarter. The more the AI system is used, the more the recognition rate of the AI system may improve and the AI system may more accurately understand a user preference, and thus, an existing rule based smart system is gradually being replaced by a deep learning based AI system.

AI technology refers to machine learning (deep learning) and element technologies that utilize the machine learning.

Machine learning is an algorithm technology that classifies/learns the features of input data autonomously. Element technology is a technology that consists of technical fields such as linguistic understanding, visual comprehension, reasoning/prediction, knowledge representation, and motion control.

AI technology is applied to various fields such as linguistic understanding, which is a technology to recognize and apply/process human language/characters and includes natural language processing, machine translation, dialogue systems, query response, speech recognition/synthesis, and the like; visual comprehension, which is a technology to recognize and process objects in a manner similar to human vision and includes object recognition, object tracking, image search, human recognition, scene understanding, spatial understanding, image enhancement, and the like; reasoning prediction, which is a technology to acquire and logically infer and predict information and includes knowledge/probability based reasoning, optimization prediction, preference based planning, recommendation, and the like; knowledge representation, which is a technology to automate human experience information into knowledge data and includes knowledge building (data generation/classification), knowledge management (data utilization), and the like; and motion control, which is a technology to control autonomous traveling of a vehicle and motion of a robot, and includes motion control (navigation, collision avoidance, and traveling), operation control (behavior control), and the like.

As multimedia technology and network technology develop, users may receive various services using devices. In particular, as speech recognition technology develops, users may input a speech input to a device and receive a response message according to the speech input through a service providing agent.

However, in the related art, there is a problem in that a name of each service providing agent must be input by a user exactly to select an appropriate service providing agent. Accordingly, there is a need for a technique capable of effectively providing a service through an appropriate service providing agent among a plurality of service providing agents even though the user does not know the name of the service providing agent.

SUMMARY

Additional aspects will be set forth in part in the description which follows and, in part, will be apparent from the description, or may be learned by practice of the presented embodiments of the disclosure.

According to embodiments of the disclosure, a device for providing a response message to a user input includes a memory storing at least one instruction; a sensing unit; a microphone; a display; and a processor configured to execute the at least one instruction to: obtain location information of the device through the sensing unit; execute a service providing agent corresponding to the location information among a plurality of service providing agents; receive a speech input from a user through the microphone; generate the response message related to a service provided through the executed service providing agent, based on the received speech input; and display the generated response message on the display, wherein the executed service providing agent generates the response message from the received speech input using a trained model trained using an artificial intelligence (AI) algorithm, and wherein the trained model corresponds to the executed service providing agent among a plurality of trained models respectively trained for a plurality of services provided through the plurality of service providing agents.

According to embodiments of the disclosure, a method, performed by a device, of providing a response message to a user input includes obtaining location information of the device; executing a service providing agent corresponding to the location information among a plurality of service providing agents; receiving a speech input from a user; generating the response message related to a service provided through the executed service providing agent, based on the received speech input; and displaying the generated response message, wherein the executed service providing agent generates the response message from the received speech input using a trained model trained using an artificial intelligence (AI) algorithm, and wherein the trained model corresponds to the executed service providing agent among a plurality of trained models respectively trained for a plurality of services provided through the plurality of service providing agents.

According to embodiments of the disclosure, a non-transitory computer-readable recording medium having recorded thereon a program for executing the method on a computer is provided.

According to embodiments of the disclosure, a method, performed by a device, of providing a response message to a user input includes obtaining location information of the device; executing a service providing agent from among a plurality of service providing agents, the service providing agent corresponding to the location information; receiving a speech input from a user; generating the response message based on the received speech input, the response message being related to a service provided by the executed service providing agent; and displaying the generated response message, wherein the executed service providing agent generates the response message using a model trained using an artificial intelligence (AI) algorithm, the trained model being one from among a plurality of trained models each corresponding to a respective service from among a plurality of services provided by a respective service providing agent from among the plurality of service providing agents, and wherein the trained model corresponds to the executed service providing agent.

The AI algorithm used to train the trained model may include at least one from among machine learning, neural network, gene, deep learning, or a classification algorithm.

The receiving of the speech input may include displaying a notification message indicating that the service providing agent has been executed; and receiving the speech input from the user in response to the notification message.

The executing of the service providing agent may include receiving a speech input for executing the service providing agent from the user; and executing the service providing agent in response to the received speech input.

The method may further include determining whether a payment is necessary according to the provided service; displaying a message recommending the payment based on a result of the determining; and executing an application for performing the payment, based on a user input in response to the message recommending the payment.

The executing of the service providing agent may include transmitting the location information to an intermediate server; receiving information regarding which service providing agent from among the plurality of service providing agents corresponds to the location information in response to the transmitting of the location information to the intermediate server; and based on the received information, executing the service providing agent that corresponds to the location information.

The generating of the response message may include converting the received speech input into text; transmitting the text to an intermediate server; and receiving the response message from the intermediate server, the response message being generated based on the text.

The method may further include obtaining additional information related to provision of the service; and providing the additional information together with the response message, wherein the additional information comprises at least one from among a waiting time regarding the provided service and a place in line regarding the provided service.

The method may further include, in response to the speech input, receiving information related to the service from a server that provides the service.

The location information may include at least one from among global positioning system (GPS) information of the device and communication interface connection information.

According to embodiments of the disclosure, a device for providing a response message to a user input includes a memory storing at least one instruction; a sensing unit; a microphone; a display; and a processor configured to execute the at least one instruction to obtain location information of the device using the sensing unit; execute a service providing agent from among a plurality of service providing agents, the service providing agent corresponding to the location information; receive a speech input from a user using the microphone; generate the response message based on the received speech input, the response message being related to a service provided by the executed service providing agent; and display the generated response message on the display, wherein the executed service providing agent generates the response message using a model trained using an artificial intelligence (AI) algorithm, the trained model being one from among a plurality of trained models each corresponding to a respective service from among a plurality of services provided by a respective service providing agent from among the plurality of service providing agents, and wherein the trained model corresponds to the executed service providing agent.

The AI algorithm used to train the trained model may include at least one from among machine learning, neural network, gene, deep learning, or a classification algorithm.

The processor may be further configured to execute the at least one instruction to display a notification message indicating that the service providing agent has been executed and receive the speech input from the user in response to the notification message.

The processor may be further configured to execute the at least one instruction to receive a speech input for executing the service providing agent from the user and execute the service providing agent in response to the received speech input.

The processor may be further configured to execute the at least one instruction to determine whether a payment is necessary according to the provided service, display a message recommending the payment based on a result of the determining, and execute an application for performing the payment, based on a user input in response to the message recommending the payment.

The processor may be further configured to execute the at least one instruction to transmit the location information to an intermediate server through a communication interface, receive information regarding which service providing agent from among the plurality of service providing agents corresponds to the location information in response to transmission of the location information to the intermediate server, and based on the received information, execute the service providing agent that corresponds to the location information.

The processor may be further configured to execute the at least one instruction to convert the received speech input into text, transmit the text to an intermediate server, and receive the response message from the intermediate server, the response message being generated based on the text.

The processor may be further configured to execute the at least one instruction to, in response to the speech input, obtain information related to the service from a server that provides the service.

The location information may include at least one from among global positioning system (GPS) information of the device and communication interface connection information.

According to embodiments of the disclosure, a non-transitory computer-readable recording medium may have recorded thereon a program for executing the above-noted method on a computer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
FIG. 1 is a diagram illustrating an example in which a device provides a response message to a speech input of a user according to an embodiment.

Embodiments of the disclosure will be described in detail in order to fully convey the scope of the disclosure and enable one of ordinary skill in the art to embody and practice the disclosure. The disclosure may, however, be embodied in many different forms and should not be construed as being limited to the embodiments set forth herein. Also, parts in the drawings unrelated to the detailed description are omitted to ensure clarity of the disclosure. Like reference numerals in the drawings denote like elements.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may or may not further include other elements, without excluding any of the other elements.

Hereinafter, the disclosure will be described in detail by explaining embodiments of the disclosure with reference to the attached drawings.

Throughout the disclosure, the expression "at least one of a, b or c" indicates only a, only b, only c, both a and b, both a and c, both b and c, all of a, b, and c, or variations thereof.

FIG. 1 is a diagram illustrating an example in which a device 1000 provides a response message for a speech input of a user according to embodiments of the disclosure.

Referring to FIG. 1, the device 1000 may execute a service providing agent corresponding to location information of the device 1000 among a plurality of service providing agents. Also, the user may input the speech input to the device 1000. The device 1000 may provide the response message that matches meaning indicated by the speech input of the user. In other words, the response message may be a contextually appropriate response to the speech input of the user. The device 1000 may generate the response message through the service providing agent executed from the speech input of the user using a trained model trained using an artificial intelligence (AI) algorithm.

For convenience, it is described that the device 1000 provides the response message to the speech input of the user throughout the specification, but the disclosure is not limited thereto. The device 1000 may provide the response message to a text input of the user. For example, the device 1000 may execute the service providing agent corresponding to the location information of the device 1000 among the plurality of service providing agents. Also, the user may enter the text input to the device 1000. The device 1000 may provide the response message that matches meaning indicated by the text input of the user. In other words, the response message may be a contextually appropriate response to the text input of the user. The device 1000 may generate the response message through the service providing agent executed from the text input of the user using the trained model trained using the AI algorithm.

The service providing agent is a program for performing a conversation with the user using the trained model trained using the AI algorithm, and may include, but is not necessarily limited to, a chatbot. Also, one service providing agent may correspond to one trained model. The one trained model may correspond to a currently executed service providing agent among a plurality of trained models respectively trained for a plurality of services provided through the plurality of service providing agents. In other words, each service providing agent may provide a particular service, and each particular service may make use of a particular trained model.

The device 1000 may be a smart phone, a tablet PC, a PC, a smart TV, a mobile phone, a personal digital assistant (PDA), a laptop, a media player, a micro server, a global positioning system (GPS), an e-book terminal, a digital broadcast terminal, a navigation device, a kiosk, an MP3 player, a digital camera, consumer electronics, or another mobile or non-mobile computing device but is not limited thereto. Also, the device 1000 may be a wearable device, such as a watch, a pair of glasses, a hair band, a ring, etc. having a communication function and a data processing function, but is not limited thereto. The device 1000 may include any kind of device capable of receiving the speech input of the user and/or the text input and providing the response message to the user.

Also, the device 1000 may communicate with an intermediate server 2000 and another device (not shown) over a predetermined network to provide the response message. In this case, the network may include a local area network (LAN), a wide area network (WAN), a value added network (VAN), a mobile radio communication network, a satellite communication network, or any combination thereof, may be a generalized data communication network by which network configuration subjects may smoothly communicate with each other, and may include wired Internet, wireless Internet, and a mobile wireless communication network. Wireless communication may include, for example, Wi-Fi, Bluetooth, Bluetooth low energy, ZigBee, Wi-Fi Direct, ultra wideband (UWB), infrared data association (IrDA), near Field communication (NFC), and the like, but is not limited thereto.

Figure 2:
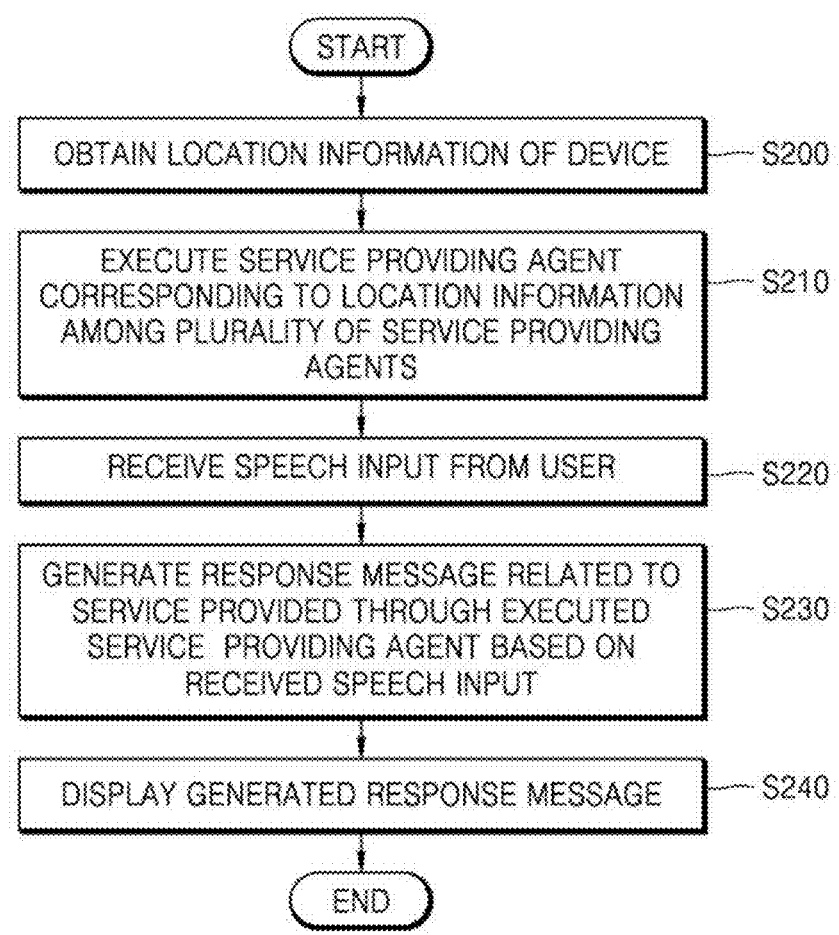
FIG. 2 is a flowchart of a method, performed by a device, of providing a response message to a speech input of a user according to an embodiment.

FIG. 2 is a flowchart of a method, performed by the device 1000, of providing a response message to a speech input of a user according to embodiments of the disclosure.

In operation S200, the device 1000 may obtain location information of the device 1000.

In an embodiment of the disclosure, the location information of the device 1000 may include at least one of GPS information of the device 1000 or communication interface connection information. The device 1000 may obtain the GPS information of the device 1000 sensed by a location sensor and thereby determine a place where the device 1000 is currently located. Alternatively, location coordinates of the device 1000 may be obtained.

In an embodiment of the disclosure, the device 1000 may obtain location information of the device 1000 via a communication interface. For example, the device 1000 may determine the place where the device 1000 is located via an NFC tag. Also, for example, the device 1000 may determine the place where the device 1000 is located via an identifier of Wi-Fi. For example, the device 1000 may identify the place where the device 1000 is located by identifying an SSID of Wi-Fi to which the device 1000 is connected.

In operation S210, the device 1000 may execute a service providing agent corresponding to the location information among a plurality of service providing agents. The device 1000 may select and execute the service providing agent corresponding to the location information from among the plurality of service providing agents based on the location information of the device 100. For example, when the device 1000 senses an NFC tag associated with Brand A coffee shop in a predetermined time, the device 1000 may execute a Brand A coffee service providing agent among the Brand A coffee service providing agent, a Brand B taxi service providing agent, and a Brand C restaurant service providing agent.

Alternatively, the device 1000 may transmit the location information of the device 1000 to the intermediate server 2000, and in response to the location information transmitted to the intermediate server 2000, may receive information about the service providing agent corresponding to the location information among the plurality of service providing agents. The device 1000 may receive the information about the service providing agent from the intermediate server 2000. Also, the device 1000 may execute the service providing agent based on the received information about the service providing agent. For example, when the GPS information of the device 1000 is transmitted to the intermediate server 2000, the intermediate server 2000 may confirm that the GPS information of the device 1000 matches GPS information of a Brand C restaurant, and may transmit to the device 1000 that the Brand C restaurant service providing agent is selected from among the plurality of service providing agents. Accordingly, the device 1000 may execute the Brand C restaurant service providing agent.

In operation S220, the device 1000 may receive the speech input of the user.

In an embodiment of the disclosure, the device 1000 may execute an application that performs an operation of the device 1000 based on the speech input of the user, and may receive the speech input of the user via the executed application. The device 1000 may receive the speech input of the user input through a microphone by, for example, executing a voice assistant application and controlling the executed application.

Alternatively, the device 1000 may receive a text input of the user. For example, the device 1000 may receive text input through a touch input of the user.

In an embodiment of the disclosure, the device 1000 may receive the speech input of the user via the automatically execute service providing agent itself, based on the location information, instead of via the voice assistant application. The device 1000 may display a notification message indicating that the service providing agent is executed and may receive the speech input from the user in response to displaying the notification message. For example, the device 1000 may display a notification message "What may I do to help?", but is not limited thereto. The notification message may be a speech in an audio output or may be a visual display. The device 1000 may receive the speech input of the user input through the microphone by, for example, executing the service providing agent and controlling the executed service providing agent. For example, the device 1000 may receive a speech input of the user "Order Americana". An example in which the device 1000 automatically executes the service providing agent corresponding to the location information of the device 1000 according to an embodiment of the disclosure will be described later with reference to FIG. 3.

In an embodiment of the disclosure, the device 1000 may receive a speech input which is a voice command for executing the service providing agent and may execute the service providing agent corresponding to the location information of the device 100, based on the received speech input of the user, and may receive another speech input of the user via the executed service providing agent.

In an embodiment of the disclosure, the device 1000 may receive a text input for executing the service providing agent and may execute the service providing agent corresponding to the location information of the device 100, based on the received text input of the user, and may receive another text input of the user via the executed service providing agent.

An example in which the device 1000 executes the service providing agent in response to the speech input of the user according to an embodiment of the disclosure will be described later in FIG. 4.

In operation S230, the device 1000 may generate the response message related to a service provided via the executed service providing agent, based on the speech input of the user.

The device 1000 may interpret the speech input of the user using various natural language analysis techniques via the executed service providing agent and may generate the response message based on an interpreted meaning of the speech input of the user. The response message generated based on the speech input of the user may include content matching or responding to a query of the user, an order, a payment, and the like. For example, when the device 1000 receives a speech input for ordering a specific food, the device 1000 may generate a response message related to a service that provides the specific food.

Alternatively, the device 1000 may generate the response message related to the service provided through the executed service providing agent, based on the text input of the user.

The executed service providing agent may generate the response message from the speech input of the user or the text input using a trained model trained using an AI algorithm. For example, the device 1000 may generate the response message using the trained model trained using at least one of machine learning, neural network, gene, deep learning, or a classification algorithm as the AI algorithm.

Also, the trained model used in the executed service providing agent may correspond to an executed service providing agent among a plurality of trained models, each of which is trained for each of a plurality of services provided through the plurality of service providing agents. In other words, each trained model may correspond to a respective service, and each service may correspond to a respective service providing agent. For example, a first service providing agent may correspond to a first trained model, a second service providing agent may correspond to a second trained model, and a third service providing agent may correspond to a third trained model. For example, in a case where the first service providing agent is an agent of a coffee shop, the first trained model may be a trained model trained for providing a coffee service.

In an embodiment of the disclosure, the device 1000 may receive text directly from the user via a user input, and may obtain text by converting the speech input of the user into speech to text (STT). Also, the device 1000 may generate the response message by interpreting and grasping the meaning of the text using a natural language analysis technique.

For example, supervised learning using a predetermined speech input and/or a predetermined text input as an input value, and unsupervised learning finding a pattern for generating the response message by learning a type of a speech input necessary for generating the response message for itself without any supervising may be used to generate the response message. Further, for example, reinforcement learning using feedback on correctness of a result of generation of the response message based on learning may be used for generating the response message.

Alternatively, the device 1000 may convert the speech input of the user into text and transmit the converted text to the intermediate server 2000. Also, the device 1000 may receive a response message generated based on the text from the intermediate server 2000.

Alternatively, the device 1000 may receive the text input from the user and transmit received text to the intermediate server 2000. Also, the device 1000 may receive a response message generated based on the text from the intermediate server 2000.

In operation S240, the device 1000 may display the generated reply message on a screen of the device 1000. The device 1000 may display the response message on the screen of the device 1000 in a conversation form.

Figure 3:
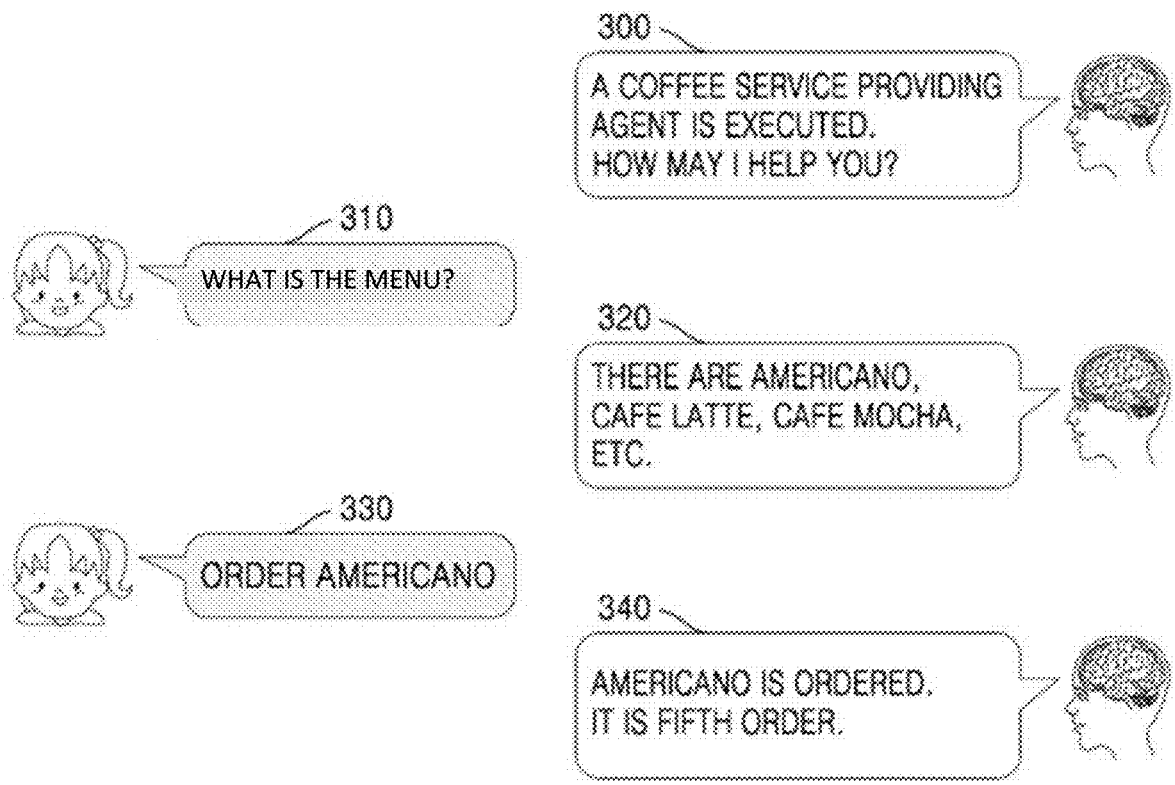
FIG. 3 is a diagram illustrating an example in which a device executes a service providing agent corresponding to location information of the device according to an embodiment.

FIG. 3 is a diagram illustrating an example in which the device 1000 executes a service providing agent corresponding to location information of the device 1000 according to embodiments of the disclosure.

Referring to FIG. 3, based on the location information of the device 1000, when the device 1000 is confirmed to be currently located at the Brand A coffee shop, the device 1000 may automatically execute the Brand A coffee service providing agent. Accordingly, a user may be conveniently provided with a coffee service through the Brand A coffee service providing agent even when the user does not know a name of a currently located place ("Brand A coffee shop"). Also, even when communication is difficult for the user to directly order because, for example, the "Brand A coffee shop" is located in a foreign country where the user does not speak the language, the user may be conveniently provided with the coffee service through the Brand A coffee service providing agent regardless of the spoken language.

Also, the device 1000 may display a notification message informing that the Brand A coffee service providing agent has been executed. For example, the device 1000 may display a notification message 300 informing that "Brand A coffee service providing agent has been executed. What can I do for you?" Through this, the user may confirm that the coffee service may be currently provided through the Brand A coffee service agent.

The device 1000 may receive a speech input of the user in response to the notification message 300. The speech input may include a query to be provided with the coffee service. For example, the device 1000 may receive a speech input 310 "What is the menu?" but is not limited thereto. The device 1000 may receive a text input "What is the menu?" from the user.

The device 1000 may provide a response message that matches or responds to the speech input of the user querying the menu. In an embodiment of the disclosure, the device 1000 may generate the response message in response to the speech input, by receiving information related to a service from a service providing server 3000 (i.e., a server) providing the service. For example, the device 1000 may request the service provider server 3000 of the Brand A coffee shop to request a menu provided by the Brand A coffee shop, and may receive information related to a service indicating that the menu includes items such as Americano, Cafe Latte, Cafe Mocha, etc. from the service providing server 3000 of the Brand A coffee shop in response to a request. The device 1000 may generate the response message based on the information related to the service. For example, the device 1000 may display a response message 320 indicating that "there are Americano, Cafe Latte, Cafe Mocha, etc."

In an embodiment of the disclosure, the device 1000 may receive the information related to the service from the service providing server 3000 via the intermediate server 2000.

The device 1000 may receive another speech input from the user in response to the response message. For example, the device 1000 may receive a speech input for ordering an item from the menu from the user. For example, the device 1000 may receive a speech input 330 of the user "Order Americana".

Also, the device 1000 may generate a response message to confirm details ordered by the user. In this case, the device 1000 may include additional information related to provision of the service in the response message. For example, the device 1000 may include text indicating at least one of a waiting time regarding the provided service or a waiting order (i.e., a place in line) regarding the provided service. For example, the device 1000 may display a response message 340 indicating that "Americano is ordered. It is the fifth order". Also, the device 1000 may transmit a request to the service provider server 3000 of the Brand A coffee shop to order Americano in response to the speech input 330 of the user. Alternatively, the device 1000 may transmit the request to the service provider server 3000 of the A coffee shop to order Americano via the intermediate server 2000.

Figure 4:
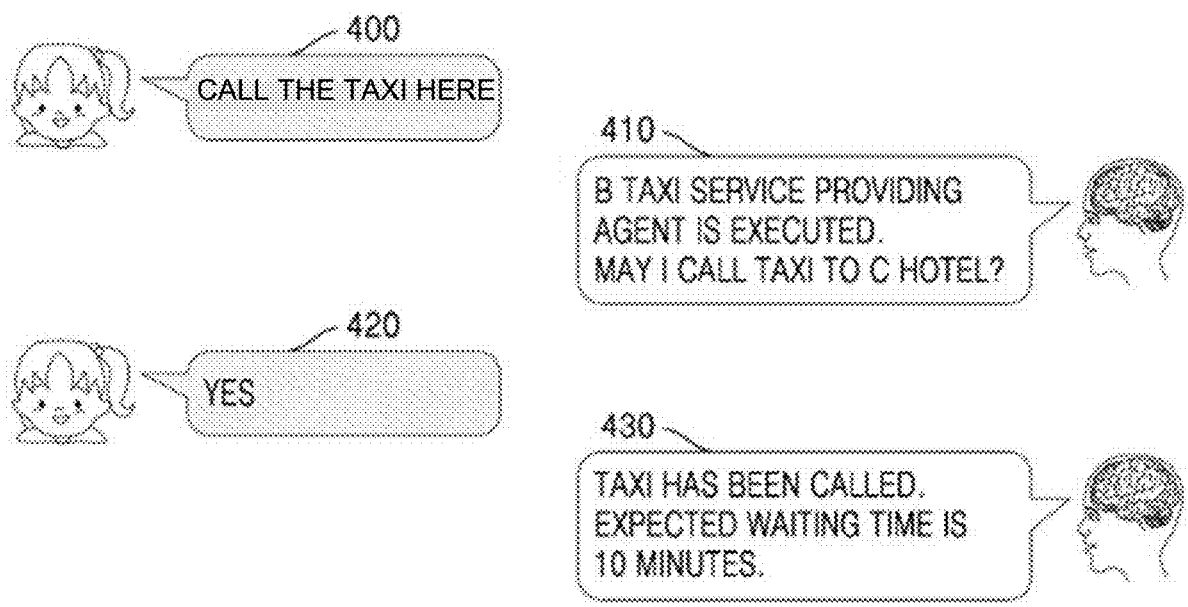
FIG. 4 is a diagram illustrating an example in which a device executes a service providing agent in response to a speech input of a user according to an embodiment.

FIG. 4 is a diagram illustrating an example in which the device 1000 executes a service providing agent in response to a speech input of a user according to embodiments of the disclosure.

Referring to FIG. 4, the device 1000 may receive the speech input for executing the service providing agent from the user and execute the service providing agent in response to the received speech input. For example, the device 1000 may receive a speech input 400 from the user "Call the taxi here".

The device 1000 may execute the service providing agent matching or responding to the meaning indicated by the speech input of the user in response to the speech input of the user for executing the service providing agent. For example, the device 1000 may execute the Brand B taxi service providing agent in response to the speech input 400 requesting provision of a taxi. Also, the device 1000 may provide a response message to the speech input of the user. For example, when device 1000 is confirmed to be currently located within a Brand C hotel, the device 1000 may generate the response message querying to call a taxi to the Brand C hotel. For example, the device 1000 may display a response message 410 that "B taxi service providing agent is executed, May I call the taxi to C hotel?"

Also, the device 1000 may then receive another speech input of the user through the executed service providing agent. For example, the device 1000 may receive a speech input 420 "Yes" as a response to the response message 410 querying whether to provide a service to a current location of the device 1000.

Also, the device 1000 may generate a response message to confirm details requested by the user. In this case, the device 1000 may include additional information related to provision of the service in the response message. Also, the device 1000 may request the additional information from the service providing server 3000 to include the additional information in the response message and receive the additional information in response to a request. For example, the device 1000 may include text indicating a waiting time regarding the provided service. For example, the device 1000 may display a response message 430 indicating that "Taxi has been called. Expected waiting time is 10 minutes". Also, the device 1000 may transmit a request to the service provider server 3000 of the Brand B taxi to call the taxi in response to the speech input 420 of the user. Alternatively, the device 1000 may transmit the request to the service provider server 3000 of the Brand B taxi to call the taxi via the intermediate server 2000.

Figure 5:
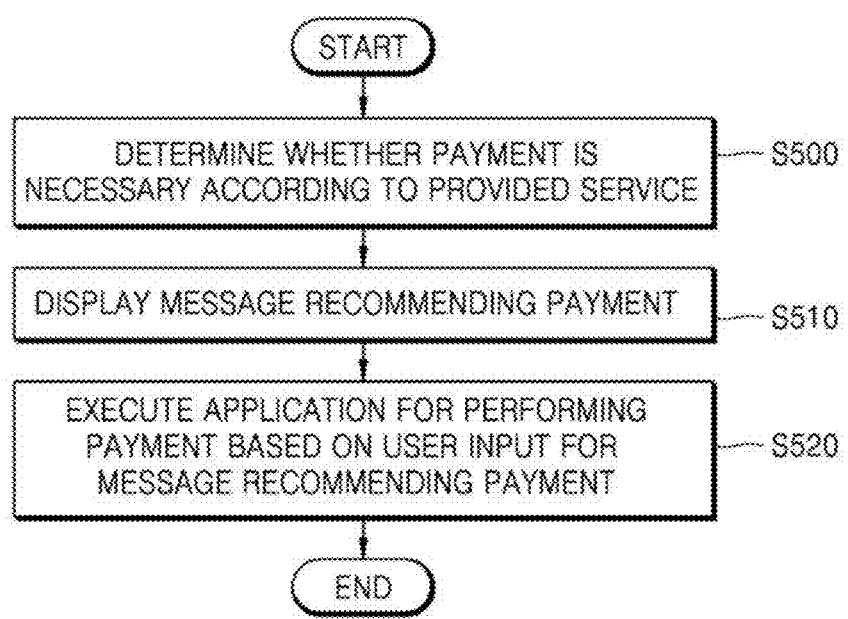
FIG. 5 is a flowchart of a method, performed by a device, of displaying a message for recommending a payment according to an embodiment.

FIG. 5 is a flowchart of a method performed by the device 1000 of displaying a message for recommending a payment according to embodiments of the disclosure.

In operation S500, the device 1000 may determine whether payment is necessary according to provision of a service. The device 1000 may determine whether the payment according to provision of the service is necessary by using a trained model corresponding to an executed service providing agent. For example, when the interpreted meaning of a speech input of a user is to request a taxi service providing transportation to a Brand A department store and the device 1000 provides the taxi service to the destination of the Brand A department store, the device 100 may determine that the payment is necessary to allow the user to conveniently purchase the taxi service.

Meanwhile, operations for recommending the payment may be performed based on learning according to a predetermined reference. For example, determination of whether the payment is necessary may be performed based on learning according to a deep neural network technology.

Figure 6:
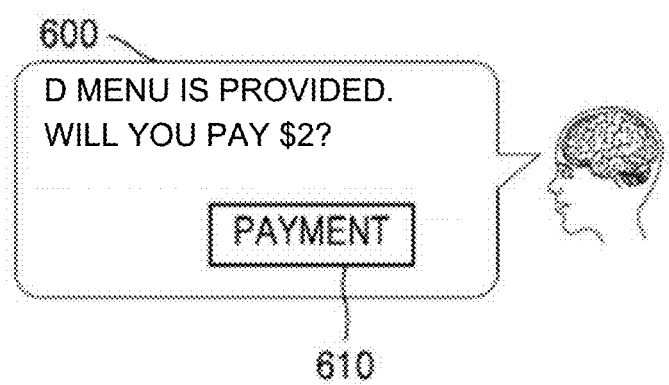
FIG. 6 is a diagram illustrating an example in which a device displays a message for recommending a payment according to an embodiment.

As a result of determination in operation S500, when it is determined that the payment is necessary, the device 1000 may display a message recommending the payment in operation S510. For example, as shown in FIG. 6, the device 1000 may display a message on a screen of the device 1000 inquiring whether to pay an amount of $2 according to an order of a Brand D menu.

Also, the message recommending the payment may include an object for executing an application for performing the payment. For example, the message inquiring whether to pay may include an icon (e.g., button 610 shown in FIG. 6) for executing the application for performing the payment.

Also, the device 1000 may confirm whether a service requested by the user has been provided and display the message recommending the payment. For example, when the user requests a taxi service, the device 1000 may confirm whether the device 1000 has arrived at a destination requested by the user and display the message recommending the payment.

In operation S520, the device 1000 may execute the application for performing the payment. For example, when the icon of the application included in the message recommending the payment is selected by the user, the device 1000 may execute the application for performing the payment.

It is described that in operation S520, the device 1000 displaying the message for recommending the payment and executes the application for performing the payment according to a user input, but is not limited thereto. When it is determined in operation S500 that the payment is necessary, the device 1000 may automatically execute the application for performing the payment.

FIG. 6 is a diagram illustrating an example in which the device 1000 displays a message 600 for recommending a payment according to embodiments of the disclosure.

Referring to FIG. 6, when a speech input of a user "Order a Brand D menu" is received, the device 1000 may display a message 600 inquiring whether to pay according to provision of the Brand D menu after providing the Brand D menu. Also, the message 600 for recommending the payment may include a button 610 for executing an application for paying.

Figure 7:
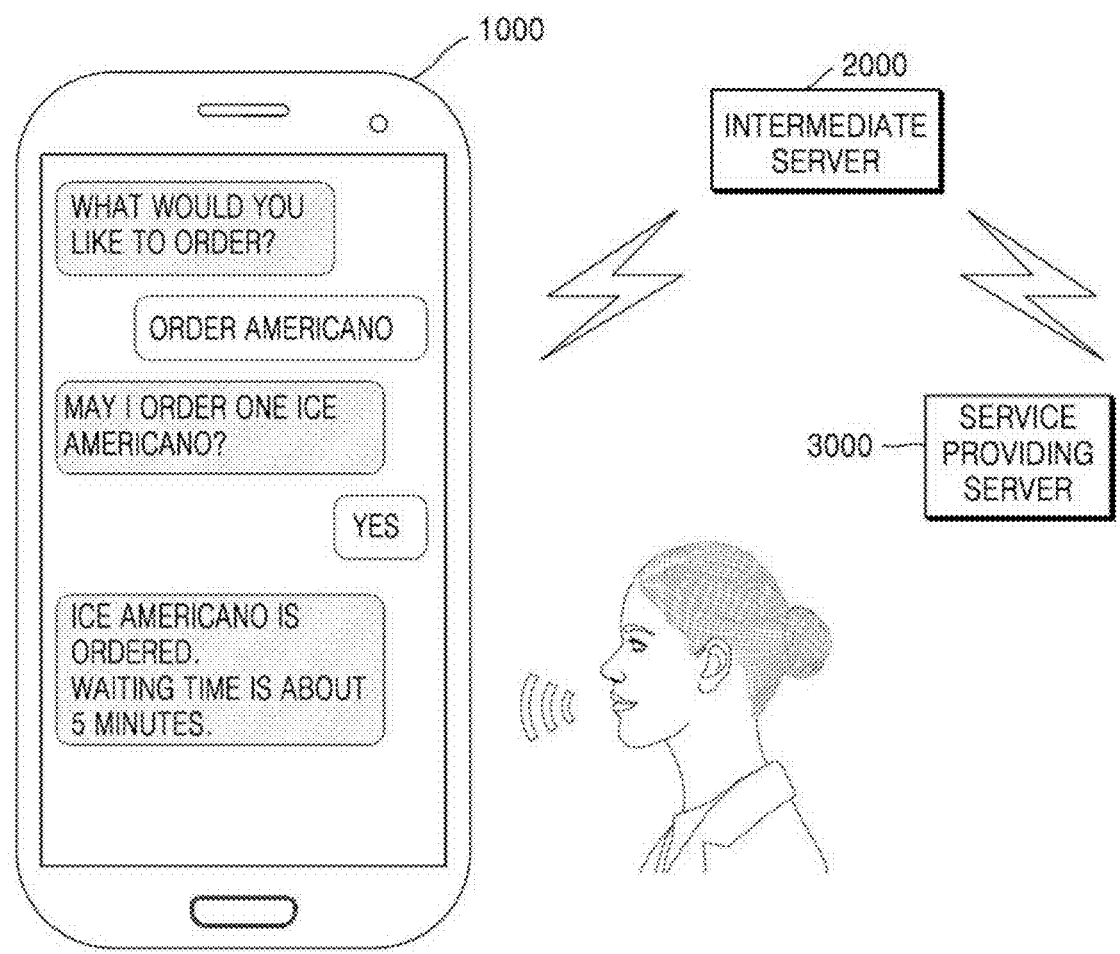
FIG. 7 is a diagram illustrating an example in which a device provides a response message to a speech input of a user by interacting with an intermediate server according to an embodiment.

FIG. 7 is a diagram illustrating an example in which the device 1000 provides a response message to a speech input of a user by interacting with the intermediate server 2000 according to some embodiments of the disclosure.

Referring to FIG. 7, the device 1000 may be connected to the intermediate server 2000 over a network and provide the response message to the speech input of the user using data learned according to a predetermined reference by the intermediate server 2000.

In this case, the intermediate server 2000 may perform at least one of a function of executing a service providing agent corresponding to location information among a plurality of service providing agents, a function of generating a response message based on a speech input, a function of recommending a payment according to provision of a service, or a function of providing additional information related to the provided service, which are functions performed by the device 1000 in FIGS. 1 to 6.

In this case, the device 1000 may directly communicate with the service providing server 3000 through the intermediate server 2000 without directly interacting with the service providing server 3000 and providing the service to the user.

In this case, the device 1000 and the intermediate server 2000 may transmit and receive necessary data to and from each other to perform their respective functions. For example, the device 1000 may provide the intermediate server 2000 with data necessary for a predetermined function performed by the intermediate server 2000, and the device 1000 may receive resultant data generated according to the function performed by the intermediate server 2000 from the intermediate server 2000. The intermediate server 2000 may also provide data necessary for a predetermined function performed by the device 1000 to the device 1000, and the intermediate server 2000 may receive resultant data generated according to the function performed by the device 1000 from the device 1000.

Further, the intermediate server 2000 may manage at least one of data necessary for executing the service providing agent corresponding to the location information among the plurality of service providing agents, data necessary for generating the response message based on the speech input, data necessary for recommending the payment according to provision of the service, and data necessary for providing the additional information related to the provided service.

Figure 8:
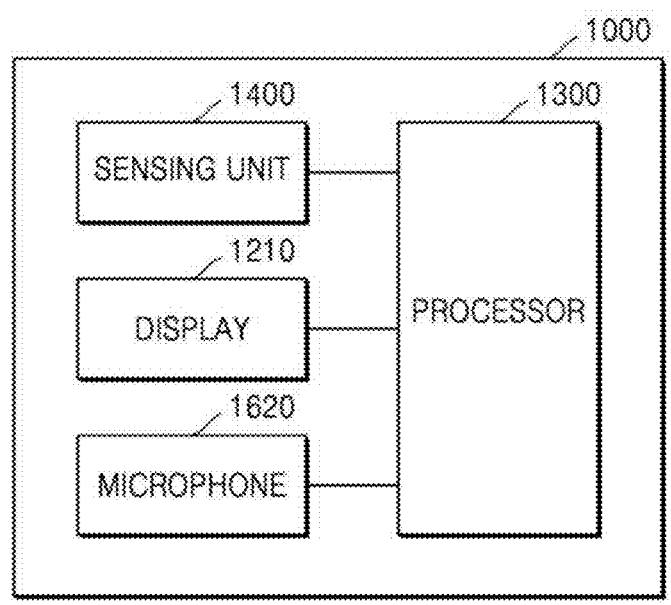
FIG. 8 is a block diagram of a device according to an embodiment.
Figure 9:
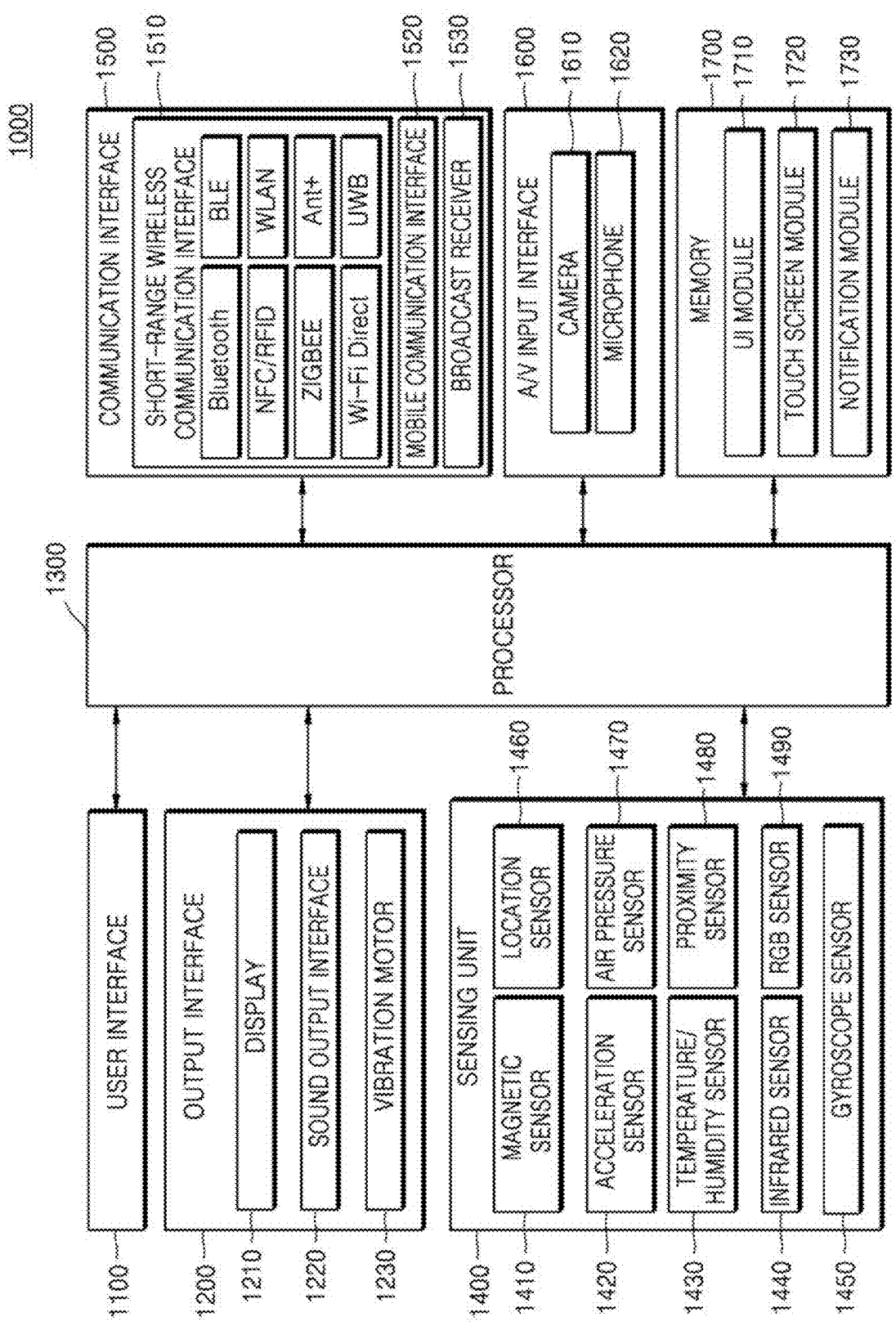
FIG. 9 is block diagram of a device according to an embodiment.

FIG. 8 is a block diagram of the device 1000 according to embodiments of the disclosure. FIG. 9 is a more detailed block diagram of the device 1000 according to embodiments of the disclosure.

As shown in FIG. 8, the device 1000 according to embodiments of the disclosure may include a display 1210, a sensing unit 1400, a processor 1300, and a microphone 1620. However, not all of the components shown in FIG. 8 are indispensable components of the device 1000. The device 1000 may be implemented by more components than the components shown in FIG. 8, and the device 1000 may be implemented by fewer components than the components shown in FIG. 8.

For example, as shown in FIG. 9, the device 1000 according to some embodiments of the disclosure may include a user interface 1100, an output interface 1200, a communication interface 1500, an audio/video (A/V) input interface 1600, and a memory 1700, in addition to the display 1210, the sensing unit 1400, the processor 1300, and the microphone 1620.

The user interface 1100 may allow a user to input data for controlling the device 1000. For example, the user interface 1100 may include a key pad, a dome switch, a touch pad (a contact capacitance type, a pressure resistive type, an infrared ray detection type, a surface ultrasonic wave conduction type, an integral tension measurement type, a piezo effect type, etc.), a jog wheel, a jog switch, and the like, but is not limited thereto.

The user interface 1100 may request a response message to a speech input of a user and receive a user input for performing an operation related to the response message.

The output interface 1200 may output an audio signal or a video signal or a vibration signal and may include the display 1210, a sound output interface 1220, and a vibration motor 1230.

The display 1210 may display and output information processed by the device 1000. For example, the display 1210 may display a response message to the speech input of the user. Also, the display 1210 may display a user interface for requesting the response message to the speech input of the user and executing an operation related to the response message.

The sound output interface 1220 may output audio data received from the communication interface 1500 or stored in the memory 1700. The sound output interface 1220 may output sound signals related to functions (e.g., call signal reception sound, message reception sound, and alarm sound) performed by the device 1000.

The processor 1300 may generally control the overall operation of the device 1000. For example, the processor 1300 may generally control the user interface 1100, the output interface 1200, the sensing unit 1400, the communication interface 1500, and the A/V input interface 1600 by executing programs stored in the memory 1700. The processor 1300 may also perform functions of the device 1000 described in FIGS. 1 to 7 by executing the programs stored in the memory 1700.

Specifically, the processor 1300 may obtain location information of the device 100 through the sensing unit 1400 or the communication interface 1500. For example, the location information may include at least one of GPS information of the device 1000 and communication interface connection information.

In an embodiment of the disclosure, the processor 1300 may select and execute a service providing agent corresponding to location information from among a plurality of service providing agents, based on the location information of the device 1000.

In another embodiment of the disclosure, the processor 1300 may transmit the location information of the device 1000 to the intermediate server 2000 through the communication interface 1500. Also, the processor 1300 may receive information about the service providing agent corresponding to the location information among the plurality of service providing agents in response to transmission of the location information to the intermediate server 2000. The processor 1300 may execute the service providing agent based on the received information about the service providing agent.

The processor 1300 may receive a speech input of the user through the microphone 1620. In an embodiment of the disclosure, the processor 1300 may receive the speech input of the user through an automatically executed service providing agent. The processor 1300 may display a notification message on the display 1210 indicating that the service providing agent has been executed and may receive the speech input from the user in response to the notification message. The processor 1300 may, for example, receive a speech input of the user input through the microphone 1620 by executing the service providing agent and controlling the executed service providing agent.

In an embodiment of the disclosure, the processor 1300 may receive a speech input for executing the service providing agent, execute a service providing agent corresponding to the location information of the device 100 based on the received speech input of the user, and receive another speech input of the user through the executed service providing agent.

In an embodiment of the disclosure, the processor 1300 may generate a response message related to a service provided through the executed service providing agent based on the speech input of the user. The processor 1300 may interpret the speech input of the user using various natural language analysis techniques and generate the response message based on the interpreted meaning of the speech input of the user. The processor 1300 may generate the response message from the received speech input using a trained model trained using an AI algorithm via the executed service providing agent. In this case, the trained model that is used may correspond to a service providing agent executed among a plurality of trained models, each of which is trained for each of a plurality of services provided via a plurality of service providing agents. For example, the processor 1300 may generate the response message using the trained model trained using at least one of machine learning, neural network, gene, deep learning, or a classification algorithm as the AI algorithm.

In an embodiment of the disclosure, the processor 1300 may receive the response message from the intermediate server 2000 via the communication interface 1500. The processor 1300 may convert the speech input into text and transmit the text to the intermediate server 2000 and receive the response message generated based on the transmitted text from the intermediate server 2000. In this case, the intermediate server 2000 may generate a response message from the received speech input using the trained model trained using the AI algorithm.

Also, the processor 1300 may cause the display 1210 to display the generated response message.

Also, the processor 1300 may obtain additional information related to the service and display the additional information on the display 1210 together with the response message. The additional information may include at least one of a waiting time regarding the provided service or a waiting order (i.e., a place in line) regarding the provided service.

Also, the processor 1300 may receive information related to the service from the service providing server 3000 providing the service via the communication interface 1500. The processor 1300 may receive information related to a menu from the service providing server 3000, for example, when the executed service providing agent is for a restaurant.

Also, the processor 1300 may generate the response message using a data recognition model stored in the memory 1700 or the intermediate server 2000, which will be described in more detail in FIGS. 10 to 13.

The processor 1300 may also efficiently learn a reference for determining whether to recommend a payment by using the data recognition model stored in the memory 1700 or the intermediate server 2000, and provide a payment service that matches an intention of the user to the user according to a learning result.

The sensing unit 1400 may sense a state of the device 1000 or a state around the device 1000 and may transmit sensed information to the processor 1300. The sensing unit 1400 may be used to generate location information of the user or the device 1000.

The sensing unit 1400 may include at least one of a magnetic sensor 1410, an acceleration sensor 1420, a temperature/humidity sensor 1430, an infrared sensor 1440, a gyroscope sensor 1450, a location sensor (e.g., a GPS) 1460, an air pressure sensor 1470, a proximity sensor 1480, and an RGB sensor (an illuminance sensor) 1490, but is not limited thereto. Functions of respective sensors may be intuitively inferred and thus, detailed descriptions thereof will be omitted.

For example, the device 1000 may obtain the location information of the device 1000 via the location sensor 1460. For example, the location information may indicate a place at which the device 1000 is currently located or location coordinates.

The communication interface 1500 may include one or more components that allow the device 1000 to communicate with another device (not shown), the intermediate server 2000, and the service providing server 3000. The other device (not shown) may be a computing device similar to the device 1000, or may be a sensing device, but is not limited thereto. For example, the communication interface 1500 may include a short-range wireless communication interface 1510, a mobile communication interface 1520, and a broadcast receiver 1530.

The short-range wireless communication interface 1510 may include a Bluetooth communication interface, a Bluetooth low energy (BLE) communication interface, a near field communication interface, a WLAN communication interface, a WLAN (WiFi) communication interface, a Zigbee communication interface, an infrared data association (IrDA) communication interface, a Wi-Fi direct (WFD) communication interface, an ultra wideband (UWB) communication interface, an Ant+ communication interface, etc., but is not limited thereto.

In an embodiment of the disclosure, the device 1000 may obtain the location information of the device 1000 through the short-range wireless communication interface 1510. For example, the device 1000 may determine a place at which the device 1000 is located via an NFC tag. Also, for example, the device 1000 may determine place at which the device 1000 is located through an identifier of Wi-Fi. For example, the device 1000 may locate the place at which the device 1000 is located by identifying an SSID of Wi-Fi to which the device 1000 is connected.

The mobile communication interface 1520 may transmit and receive a radio signal to and from at least one of a base station, an external terminal, or a server on a mobile communication network. Here, the radio signal may include various types of data according to a voice call signal, a video call signal, or a text/multimedia message transmission/reception.

The broadcast receiver 1530 may receive a broadcast signal and/or broadcast-related information from outside through a broadcast channel. The broadcast channel may include a satellite channel and a terrestrial channel. The device 1000 may not include the broadcast receiver 1530 according to an implementation example.

Also, the communication interface 1500 may request a response message for the speech input of the user and transmit and receive information necessary for performing an operation related to the response message to another device (not shown), the intermediate server 2000, and/or the service providing server 3000).

The A/V input interface 1600 is for inputting an audio signal or a video signal, and may include a camera 1610, a microphone 1620, and the like. The camera 1610 may obtain an image frame such as a still image or a moving image through an image sensor in a video communication mode or a photographing mode. An image captured through the image sensor may be processed through the processor 1300 or a separate image processor (not shown).

The microphone 1620 may receive an external sound signal and process the received signal as electrical speech data. For example, the microphone 1620 may receive the sound signal from an external device or from the user. The microphone 1620 may receive the speech input of the user. The microphone 1620 may use various noise reduction algorithms to remove noise generated during a process of receiving the external sound signal.

The memory 1700 may store a program for processing and controlling the processor 1300 and may store data input to or output from the device 1000.

The memory 1700 may include at least one type storage medium of a flash memory type, a hard disk type, a multimedia card micro type, a card type memory (e.g., SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), a magnetic memory, a magnetic disk, an optical disk, and the like.

The programs stored in the memory 1700 may be classified into a plurality of modules according to their functions, and may include, for example, a UI module 1710, a touch screen module 1720, a notification module 1730, and the like.

The UI module 1710 may provide a specialized UI, a GUI, and the like that interact with the device 1000 for each application. The touch screen module 1720 may detect a touch gesture of the user on a touch screen and may transmit information about the touch gesture to the processor 1300.

The touch screen module 1720 according to some embodiments of the disclosure may recognize and analyze a touch code. The touch screen module 1720 may be configured as separate hardware including a controller.

The notification module 1730 may generate a signal for notifying occurrence of an event of the device 1000. Examples of events occurring in the device 1000 may include call signal reception, message reception, key signal input, schedule notification, and the like. The notification module 1730 may output a notification signal in the form of a video signal through the display 1210, in the form of an audio signal through the sound output interface 1220, and in the form of a vibration signal through the vibration motor 1230.

Figure 10:
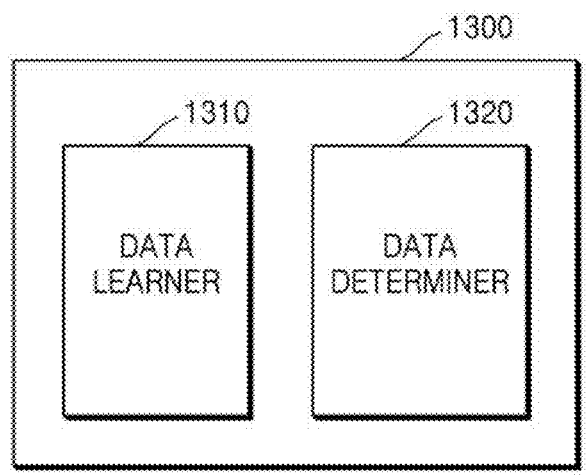
FIG. 10 is a block diagram of a processor according to an embodiment.

FIG. 10 is a block diagram of the processor 1300 according to some embodiments of the disclosure.

Referring to FIG. 10, the processor 1300 according to some embodiments of the disclosure may include a data learner 1310 and a data determiner 1320. A trained model described in FIGS. 1 to 9 may be referred to as a data determination model in FIGS. 10 to 13.

The data learner 1310 may learn a reference for generating a response message based on a speech input of a user. The data learner 1310 may learn the reference about what data to use for generating the response message. The data learner 1310 may also learn the reference about how to generate the response message using the data. The data learner 1310 may obtain data to be used for learning, and apply the obtained data to the data determination model to be described later, thereby learning the reference for generating the response message based on the speech input of the user.

The data determiner 1320 may generate the response message based on the speech input of the user. The data determiner 1320 may generate the response message from predetermined data by using a trained data determination model (i.e., a trained model). The data determiner 1320 may obtain predetermined data according to a predetermined reference by learning and use the data determination model having the obtained data as an input value. Also, the data determiner 1320 may determine content to be included in the response message based on the predetermined data by using the data determination model. Further, a resultant value output by the data determination model having the obtained data as the input value may be used to further refine the data determination model.

At least one of the data learner 1310 and the data determiner 1320 may be manufactured in the form of at least one hardware chip and mounted on the device 1000. For example, at least one of the data learner 1310 and the data determiner 1320 may be manufactured in the form of a dedicated hardware chip for AI or may be manufactured as a part of an existing general purpose processor (e.g. a CPU or an application processor) or a graphics-only processor (e.g., a GPU) and mounted on the device 1000.

In this case, the data learner 1310 and the data determiner 1320 may be mounted on one electronic device or may be mounted on separate electronic devices. For example, one of the data learner 1310 and the data determiner 1320 may be included in the device 1000, and the other may be included in the intermediate server 2000. The data learner 1310 and the data determiner 1320 may provide model information constructed by the data learner 1310 to the data determiner 1320 by wire or wirelessly, and provide data input to the data determiner 1320 to the data learner 1310 as additional training data.

Meanwhile, at least one of the data learner 1310 and the data determiner 1320 may be implemented as a software module. When the at least one of the data learner 1310 and the data determiner 1320 is implemented as the software module (or a program module including an instruction), the software module may be stored in non-transitory computer readable media. Further, in this case, at least one software module may be provided by an operating system (OS) or by a predetermined application. Alternatively, one of the at least one software module may be provided by the OS, and the other one may be provided by the predetermined application.

Figure 11:
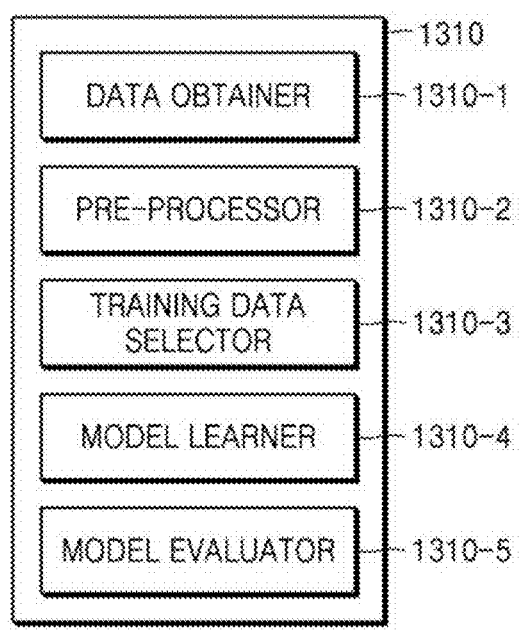
FIG. 11 is a block diagram of a data learner according to an embodiment.

FIG. 11 is a block diagram of the data learner 1310 according to some embodiments of the disclosure.

Referring to FIG. 11, the data learner 1310 according to some embodiments of the disclosure may include a data obtainer 1310-1, a preprocessor 1310-2, a training data selector 1310-3, a model learner 1310-4 and a model evaluator 1310-5.

The data obtainer 1310-1 may obtain data necessary for generating a response message based on a speech input of a user. The data obtainer 1310-1 may obtain data necessary for learning for generating the response message.

The data obtainer 1310-1 may obtain, for example, predetermined user speech information.

The preprocessor 1310-2 may pre-process the obtained data such that the obtained data may be used for learning for generating the response message. The preprocessor 1310-2 may process the obtained data in a predetermined format such that the model learner 1310-4, which will be described later, may use the obtained data for learning for generating the response message.

The training data selector 1310-3 may select data necessary for learning from the preprocessed data. The selected data may be provided to the model learner 1310-4. The training data selector 1310-3 may select the data necessary for learning from the preprocessed data according to a predetermined reference for generating the response message. The training data selector 1310-3 may also select the data according to a predetermined reference according to the learning of the model learner 1310-4, which will be described later.

The model learner 1310-4 may learn a reference as to which content is to be included in the response message based on training data. Also, the model learner 1310-4 may learn a reference as to which training data is used to generate the response message.

Also, the model learner 1310-4 may learn a data determination model used to generate the response message using the training data. In this case, the data determination model may be a previously constructed model. For example, the data determination model may be a previously constructed model by receiving basic training data (e.g., a sample image, etc.)

The data determination model may be constructed in consideration of an application field of the determination model, a purpose of learning, or the computer performance of an apparatus, etc. The data determination model may be, for example, a model based on a neural network. For example, a model such as Deep Neural Network (DNN), Recurrent Neural Network (RNN), and Bidirectional Recurrent Deep Neural Network (BRDNN) may be used as the data determination model, but is not limited thereto.

According to embodiments, when there are a plurality of data determination models that are previously constructed, the model learner 1310-4 may determine a data determination model having a high relation between input training data and basic training data as the data determination model. In this case, the basic training data may be previously classified according to data types, and the data determination model may be previously constructed for each data type. For example, the basic training data may be previously classified according to various references such as a region where the training data is generated, a time at which the training data is generated, a size of the training data, a genre of the training data, a creator of the training data, a type of an object in the training data, etc.

Also, the model learner 1310-4 may train the data determination model using a learning algorithm including, for example, an error back-propagation method or a gradient descent method.

Also, the model learner 1310-4 may train the data determination model through supervised learning using, for example, the input training data as an input value. Also, the model learner 1310-4 may train the data determination model through unsupervised learning to find the reference for situation determination by learning a type of data (i.e., a reference) necessary for situation determination for itself without any guidance. Also, the model learner 1310-4 may train the data determination model, for example, through reinforcement learning using feedback on whether a result of situation determination based on the learning is correct.

Further, when the data determination model is trained, the model learner 1310-4 may store the learned data determination model. In this case, the model learner 1310-4 may store the trained data determination model in the memory 1700 of the device 1000 including the data determiner 1320. Alternatively, the model learner 1310-4 may store the trained data determination model in a memory of the intermediate server 2000 connected to the device 1000 over a wired or wireless network.

In this case, the memory 1700 in which the trained data determination model is stored may also store, for example, a command or data related to at least one other component of the device 1000. The memory 1700 may also store software and/or a program. The program may include, for example, a kernel, middleware, an application programming interface (API), and/or an application program (or "application").

The model evaluator 1310-5 may input evaluation data to the data determination model, and when a recognition result output from the evaluation data does not satisfy a predetermined reference, the model evaluator 1310-5 may allow the model learner 1310-4 to be trained again. In this case, the evaluation data may be predetermined data for evaluating the data determination model.

For example, when the trained data determination model outputs a number or a ratio of evaluation data having an incorrect recognition result among recognition results of the trained data determination model with respect to the evaluation data that is greater than a predetermined threshold value, the model evaluator 1310-5 may evaluate that the data determination model does not satisfy the predetermined reference. For example, when the predetermined reference is defined as a ratio of 2%, and when the trained data determination model outputs an incorrect recognition result with respect to evaluation data exceeding 20 among a total of 1000 evaluation data, the model evaluator 1310-5 may evaluate that the trained data determination model is not suitable.

On the other hand, when there are a plurality of trained data determination models, the model evaluator 1310-5 may evaluate whether each of the trained motion determination models satisfies the predetermined reference and determine a model satisfying the predetermined reference as a final data determination model. In this case, when a plurality of models satisfy the predetermined reference, the model evaluator 1310-5 may determine any one or a predetermined number of models previously set in descending order of evaluation scores as the final data determination model.

Meanwhile, at least one of the data obtainer 1310-1, the preprocessor 1310-2, the training data selector 1310-3, the model learner 1310-4, and the model evaluator 1310-5 in the data learner 1310 may be manufactured in the form of at least one hardware chip and mounted on the device 1000. For example, the at least one of the data obtainer 1310-1, the preprocessor 1310-2, the training data selector 1310-3, the model learner 1310-4, and the model evaluator 1310-5 may be manufactured in the form of a dedicated hardware chip for AI or may be manufactured as a part of an existing general purpose processor (e.g. a CPU or an application processor) or a graphics-only processor (e.g., a GPU) and mounted on the device 1000.

Also, the data obtainer 1310-1, the preprocessor 1310-2, the training data selector 1310-3, the model learner 1310-4, and the model evaluator 1310-5 may be mounted on one device 1000 or may be mounted on separate electronic apparatuses. For example, some of the data obtainer 1310-1, the preprocessor 1310-2, the training data selector 1310-3, the model learner 1310-4, and the model evaluator 1310-5 may be included in the device 1000, and the others may be included in the intermediate server 2000.

Also, at least one of the data obtainer 1310-1, the preprocessor 1310-2, the training data selector 1310-3, the model learner 1310-4, and the model evaluator 1310-5 may be implemented as a software module. When the at least one of the data obtainer 1310-1, the preprocessor 1310-2, the training data selector 1310-3, the model learner 1310-4, or the model evaluator 1310-5 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

The processor 1300 may use various data determination models and efficiently learn the reference for generating the response message as various methods through the data determination models.

Figure 12:
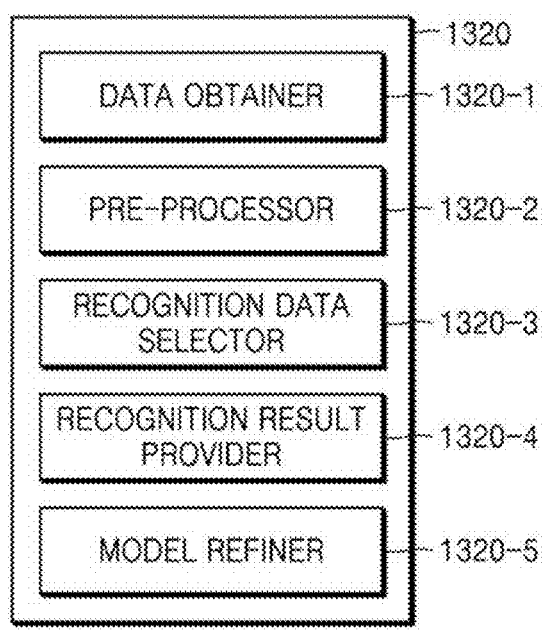
FIG. 12 is a block diagram of a data determiner according to an embodiment.

FIG. 12 is a block diagram of the data determiner 1320 according to some embodiments of the disclosure.

Referring to FIG. 12, the data determiner 1320 according to some embodiments of the disclosure may include a data obtainer 1320-1, a preprocessor 1320-2, a recognition data selector 1320-3, a recognition result provider 1320-4 and a model refiner 1320-5.

The data obtainer 1320-1 may obtain data necessary for generating a response message. For example, the data obtainer 1320-1 may obtain speech of a user input to the device 1000. Also, the data obtainer 1320-1 may obtain information related to a service provided by a service providing agent. The information related to the service may be, for example, information generated from the device 1000 or information received from an external device. The information related to the service may be, for example, information received from the service providing server 3000.

The preprocessor 1320-2 may preprocess the obtained data such that the obtained data may be used for generating the response message. The preprocessor 1320-2 may process the obtained data to a predetermined format such that the recognition result provider 1320-4, which will be described later, may use the obtained data for generating the response message.

The recognition data selector 1320-3 may select data necessary for generating the response message from the preprocessed data. The selected data may be provided to the recognition result provider 1320-4. The recognition data selector 1320-3 may select some or all of the preprocessed data according to a predetermined reference for generating the response message. The recognition data selector 1320-3 may also select data according to the predetermined reference by the learning of the model learner 1310-4, which will be described later.

The recognition result provider 1320-4 may generate the response message by applying the selected data to a data determination model. The recognition result provider 1320-4 may provide a recognition result according to a data recognition purpose. The recognition result provider 1320-4 may apply the selected data to the data determination model by using the data selected by the recognition data selector 1320-3 as an input value. Also, the recognition result may be determined by the data determination model.

The model refiner 1320-5 may modify the data determination model based on evaluation of the recognition result provided by the recognition result provider 1320-4. For example, the model refiner 1320-5 may provide the model learner 1310-4 with the recognition result provided by the recognition result provider 1320-4 such that the model learner 1310-4 may modify the data determination model.

Meanwhile, at least one of the data obtainer 1320-1, the preprocessor 1320-2, the recognition data selector 1320-3, the recognition result provider 1320-4, and the model refiner 1320-5 in the data determiner 1320 may be manufactured in the form of at least one hardware chip and mounted on the device 1000. For example, the at least one of the data obtainer 1320-1, the preprocessor 1320-2, the recognition data selector 1320-3, the recognition result provider 1320-4, and the model refiner 1320-5 may be manufactured in the form of a dedicated hardware chip for AI or may be manufactured as a part of an existing general purpose processor (e.g. a CPU or an application processor) or a graphics-only processor (e.g., a GPU) and mounted on the device 1000.

Also, the data obtainer 1320-1, the preprocessor 1320-2, the recognition data selector 1320-3, the recognition result provider 1320-4, and the model refiner 1320-5 may be mounted on one device 1000 or may be mounted on separate electronic apparatuses. For example, some of the data obtainer 1320-1, the preprocessor 1320-2, the recognition data selector 1320-3, the recognition result provider 1320-4, and the model refiner 1320-5 may be included in an electronic device, and the others may be included in a server.

Also, at least one of the data obtainer 1320-1, the preprocessor 1320-2, the recognition data selector 1320-3, the recognition result provider 1320-4, and the model refiner 1320-5 may be implemented as a software module. When the at least one of the data obtainer 1320-1, the preprocessor 1320-2, the recognition data selector 1320-3, the recognition result provider 1320-4, and the model refiner 1320-5 is implemented as the software module (or a program module including an instruction), the software module may be stored in non-transitory computer readable media. Further, in this case, at least one software module may be provided by an OS or by a predetermined application. Alternatively, one of the at least one software module may be provided by the OS, and the other one may be provided by the predetermined application.

Also, the device 1000 may provide a service matching the speech input of the user to the user by using the data determination model to which a learning result is applied.

Figure 13:
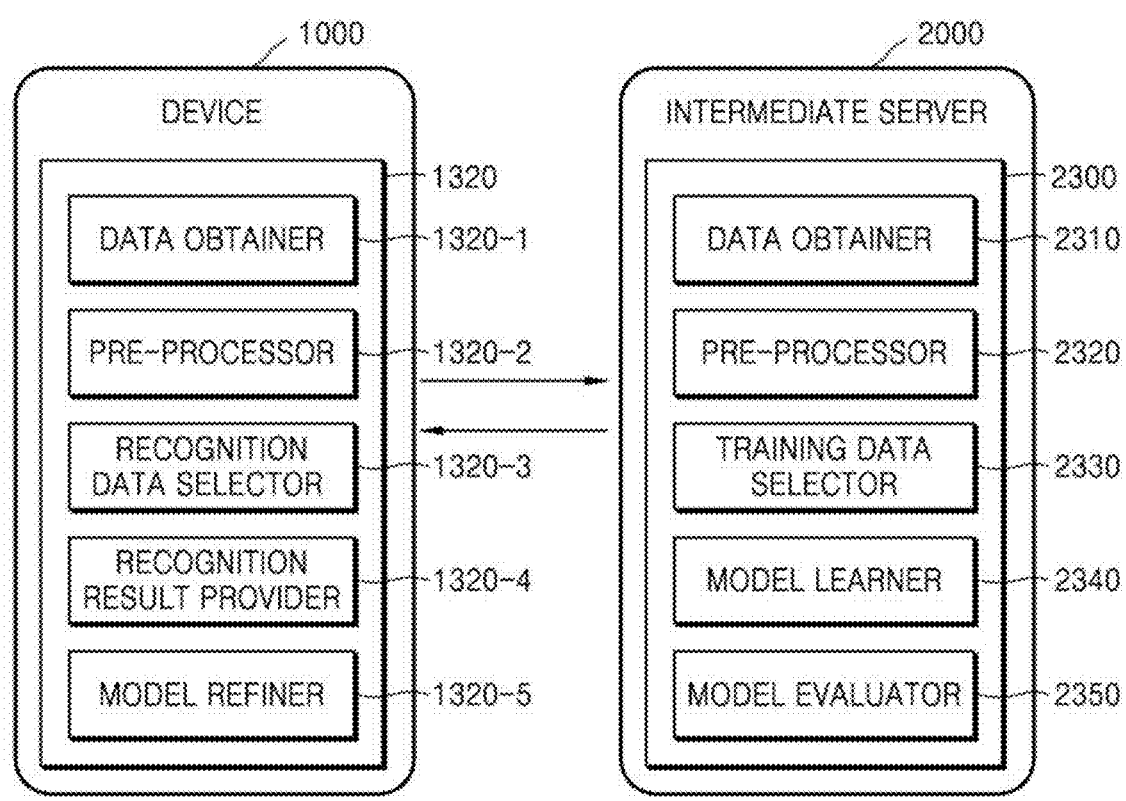
FIG. 13 is a diagram illustrating an example in which a device and an intermediate server learn and recognize data by interacting with each other according to an embodiment.

FIG. 13 is a diagram illustrating an example in which the device 1000 and the intermediate server 2000 learn and recognize data by interacting with each other according to embodiments of the disclosure.

Referring to FIG. 13, the intermediate server 2000 may learn a reference for generating a response message, and the device 1000 may generate the response message based on the learning result of the intermediate server 2000.

In this case, a data learner 2300 of the intermediate server 2000 may perform a function of the data learner 1310 shown in FIG. 10. The data learner 2300 of the intermediate server 2000 may learn a reference as to which data to use to generate the response message. Also, the data learner 2300 of the intermediate server 2000 may learn a reference how to generate the response message using the data. The data learner 2300 may learn the reference for generating the response message by acquiring data to be used for learning and applying the obtained data to a data determination model to be described later.

Also, the recognition result provider 1320-4 of the device 1000 may generate the response message by applying data selected by the recognition data selector 1320-3 to the data determination model generated by the intermediate server 2000. For example, the recognition result provider 1320-4 may transmit the data selected by the recognition data selector 1320-3 to the intermediate server 2000 and request the intermediate server 2000 to apply the data selected by the recognition data selector 1320-3 to the data determination model and generate the response message. Further, the recognition result provider 1320-4 may receive information about the response message generated by the intermediate server 2000 from the intermediate server 2000.

Alternatively, the recognition result provider 1320-4 of the device 1000 may receive the data determination model generated by the intermediate server 2000 from the intermediate server 2000 to generate the response message using the received data determination model. In this case, the recognition result provider 1320-4 of the device 1000 may apply the data selected by the recognition data selector 1320-3 to the data determination model received from the intermediate server 2000 to generate the response message.

Also, the device 1000 and the intermediate server 2000 may effectively distribute and perform tasks for learning and data recognition of a data determination model, thereby effectively performing data processing to provide a service matching the meaning of a speech input of a user and effectively protecting privacy of the user.

Embodiments of the disclosure may be implemented as a recording medium including computer-readable instructions such as a computer-executable program module. The computer-readable medium may be an arbitrary available medium accessible by a computer, and examples thereof include all volatile and non-volatile media and separable and non-separable media. Further, examples of the computer-readable medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, or other data. The communication medium generally includes computer-readable instructions, data structures, program modules, other data of a modulated data signal, or other transmission mechanisms, and examples thereof include an arbitrary information transmission medium.

Also, in this specification, the term "unit" may be a hardware component such as a processor or a circuit, and/or a software component executed by a hardware component such as a processor.

It will be understood by those skilled in the art that the foregoing description of the disclosure is for illustrative purposes only and that those of ordinary skill in the art may readily understand that various changes and modifications may be made without departing from the spirit or essential characteristics of the disclosure. It is therefore to be understood that the above-described embodiments are illustrative in all aspects and not restrictive. For example, each component described as a single entity may be distributed and implemented, and components described as being distributed may also be implemented in a combined form.

The scope of the disclosure is defined by the appended claims rather than the detailed description and all changes or modifications derived from the meaning and scope of the claims and their equivalents are to be construed as being included within the scope of the disclosure.

What is claimed is:

1. A method of providing a response message to a user of a device, the method comprising:
    obtaining location information of the device;
    based on the obtained location information, automatically executing a service providing agent by the device before a user's speech input is received,
    wherein the service providing agent is one from among a plurality of service providing agents and corresponds to one of a plurality of service brands provided at a place of the location information,
    wherein the plurality of service providing agents comprises at least some of a plurality of coffee service providing agents, taxi service providing agents and restaurant service providing agents, and
    wherein each of the plurality of service providing agents corresponds to a service brand from among the plurality of service brands;
    displaying a notification message indicating that the service providing agent has been executed;
    receiving the user's speech input from the user in response to the notification message;
    generating the response message based on the received speech input, the response message being related to a service provided by the executed service providing agent and including at least one from among content responding to a query of the user, an order, and a payment;
    obtaining additional information comprising a waiting time and the user's place in line for the provision of the service; and
    displaying the generated response message and the obtained additional information together,
    wherein the executed service providing agent generates the response message by using a model trained using an artificial intelligence (AI) algorithm,
    wherein the trained model corresponds to the executed service providing agent and is one from among a plurality of trained models each trained for each of a plurality of services provided by the plurality of service providing agents.

2. The method of claim 1, wherein the AI algorithm used to train the trained model includes at least one from among machine learning, neural network, gene, deep learning, or a classification algorithm.

3. The method of claim 1, further comprising:
    determining whether a payment is necessary by confirming whether the service requested by the user has been provided;
    displaying a message recommending the payment including an object for executing an application for performing the payment, based on a result of the determining; and
    executing the application for performing the payment, based on a user input in response to the message recommending the payment.

4. The method of claim 1, wherein the automatic executing of the service providing agent comprises:
    transmitting the location information to an intermediate server;
    receiving information regarding which service providing agent from among the plurality of service providing agents corresponds to the location information in response to the transmitting of the location information to the intermediate server; and
    based on the received information, executing the service providing agent that corresponds to the location information.

5. The method of claim 1, wherein the generating of the response message comprises:
    converting the received speech input into text;
    transmitting the text to an intermediate server; and
    receiving the response message from the intermediate server, the response message being generated based on the text.

6. The method of claim 1, further comprising: in response to the speech input, receiving information related to the service from a server that provides the service.

7. The method of claim 1, wherein the obtaining of the location information of the device comprises:
    obtaining at least one of global positioning system (GPS) information and communication interface connection information; and
    determining a place where the device is currently located based on the obtained at least one of global positioning system (GPS) information and communication interface connection information,
    wherein the communication interface connection information includes at least one of near field communication (NFC) tagging information and service set identifier (SSID) of Wi-Fi.

8. A device for providing a response message to a user of a device, the device comprising:
    a memory storing at least one instruction;
    a sensing unit;
    a microphone;
    a display; and
    a processor configured to execute the at least one instruction to:
        obtain location information of the device using the sensing unit;
        based on the obtained location information, automatically execute a service providing agent by the device before a user's speech input is received,
    wherein the service providing agent is one from among a plurality of service providing agents and corresponds to one of a plurality of service brands provided at a place of the location information, wherein the plurality of service providing agents comprises at least some of a plurality of coffee service providing agents, taxi service providing agents and restaurant service providing agents, and wherein each of the plurality of service providing agents corresponds to a service brand from among the plurality of service brands;

display a notification message indicating that the service providing agent has been executed;

receive, in response to the notification message, the user's speech input from the user using the microphone;

generate the response message based on the received speech input, the response message being related to a service provided by the executed service providing agent and including at least one from among content responding to a query of the user, an order, and a payment;

obtain additional information comprising a waiting time and the user's place in line for the provision of the service; and display the generated response message and the obtained additional information together on the display, wherein the executed service providing agent generates the response message by using a model trained using an artificial intelligence (AI) algorithm, wherein the trained model corresponds to the executed service providing agent and is one from among a plurality of trained models each trained for each of a plurality of services provided by the plurality of service providing agents.

9. The device of claim 8, wherein the AI algorithm used to train the trained model includes at least one from among machine learning, neural network, gene, deep learning, or a classification algorithm.

10. The device of claim 8, wherein the processor is further configured to execute the at least one instruction to determine whether a payment is necessary by confirming whether the service requested by the user has been provided, display a message recommending the payment including an object for executing an application for performing the payment based on a result of the determining, and execute the application for performing the payment, based on a user input in response to the message recommending the payment.

11. The device of claim 8, wherein the processor is further configured to execute the at least one instruction to transmit the location information to an intermediate server through a communication interface, receive information regarding which service providing agent from among the plurality of service providing agents corresponds to the location information in response to transmission of the location information to the intermediate server, and based on the received information, execute the service providing agent that corresponds to the location information.

12. The device of claim 8, wherein the processor is further configured to execute the at least one instruction to convert the received speech input into text, transmit the text to an intermediate server, and receive the response message from the intermediate server, the response message being generated based on the text.

13. The device of claim 8, wherein the processor is further configured to execute the at least one instruction to obtain at least one of global positioning system (GPS) information and communication interface connection information, and determine a place where the device is currently located based on the obtained at least one of global positioning system (GPS) information and communication interface connection information, the communication interface connection information including at least one of near field communication (NFC) tagging information and service set identifier (SSID) of Wi-Fi.

14. A non-transitory computer-readable recording medium having recorded thereon a program for executing the method of claim 1 on a computer.

* * * * *